Sept. 8, 1931. L. BLACKMORE 1,822,855
STEERING GEAR
Filed May 4, 1929
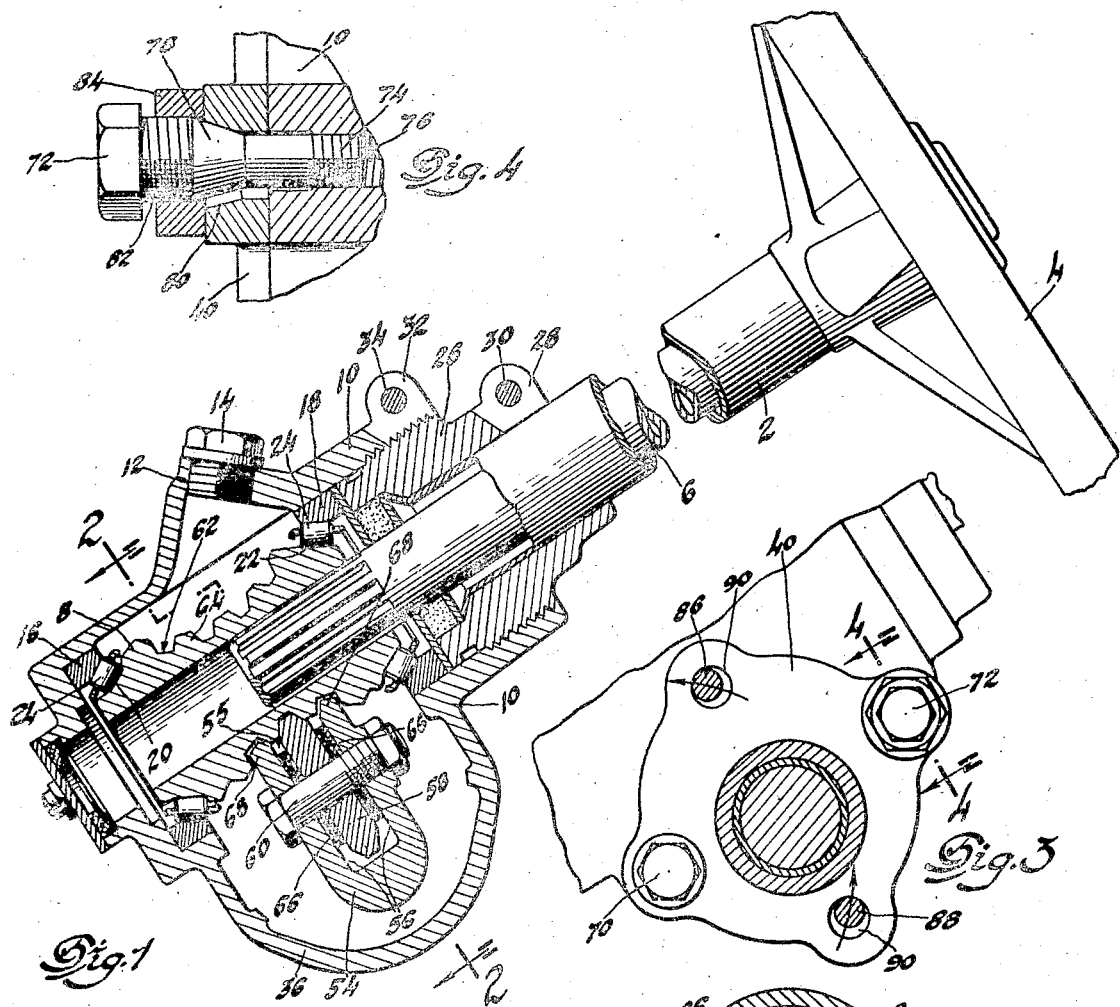
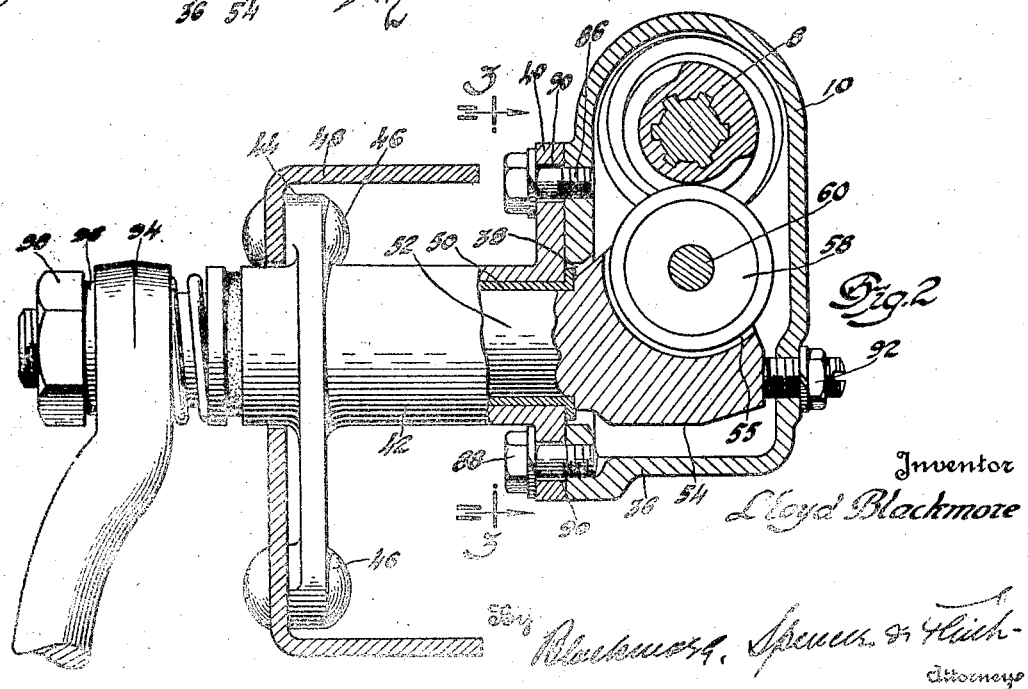
Inventor
Lloyd Blackmore Patented Sept. 8, 1931

1,822,855

UNITED STATES PATENT OFFICE

LLOYD BLACKMORE, OF DETROIT, MICHIGAN, ASSIGNOR TO GENERAL MOTORS CORPORATION, OF DETROIT, MICHIGAN, A CORPORATION OF DELAWARE

STEERING GEAR

Application filed May 4, 1929. Serial No. 360,483.

This invention relates to steering devices and has particular reference to improvements in the mechanism at the bottom of the steering columns of automotive vehicles.

The invention relates to the type of steering devices which use a gear of preferably the hour-glass or Hindley type secured to the bottom of the steering column and which gear operates a roller secured to a shaft which in turn operates the steering linkage to steer the front wheels. In devices of this kind the roller interfits in the groove formed by the thread of the worm and in case the roller is broken or damaged there will be a definite and positive interference with the steering operation. It is an object of the present invention to provide a steering mechanism which will be operable at all times regardless of whether or not the roller is broken.

The object of the invention is accomplished by providing a groove or slot in the end of the shaft in which the roller is journalled. The sides of the slot project away from the shaft and into the groove formed by the thread of the worm. However, these sides do not contact with the thread except in case the roller is broken. The motion from the worm is transmitted directly through the roller to the shaft and the sides or walls at the slot are free at all times of engagement with the thread except when the roller is broken, or is out of mesh with the thread.

The shaft on which the roller is mounted is positioned in a cover adapted to close an opening in the housing which surrounds both the Hindley worm and the roller. Inasmuch as it is not always possible to accurately position the roller with reference to the worm thread, provision is made for adjusting the cover with reference to the housing, and because the shaft and its roller are mounted on the cover and move therewith, the adjustment of the cover will bring about a simultaneous adjustment of the roller with reference to the worm. This adjustment is accomplished by providing a screw threaded bolt with a tapered shank portion adapted to fit in a tapered opening in the cover. By suitably turning the bolt into the threaded portion of the housing the tapered portion can be made to adjust the cover so as to move the roller toward the worm to get the most efficient operation between the two. When the adjustment is accomplished the cover is then rigidly secured in position.

On the drawing:

Fig. 1 shows the steering column of an automotive vehicle with parts broken away and shown in section to illustrate the invention.

Fig. 2 is a sectional view on the line 2—2 of Fig. 1.

Fig. 3 is a view taken on the line 3—3 of Fig. 2.

Fig. 4 is an enlarged detailed sectional view on the line 4—4 of Fig. 3.

Referring to the drawings the numeral 2 indicates the mast or steering column of an automotive vehicle. The steering wheel 4 is secured to the tube 6, on the lower end of which there is rigidly mounted the worm 8 which is preferably of the hour-glass or Hindley type. The worm is enclosed in a housing 10 provided with a lubricant opening 12 closed by the plug 14. At the bottom of the housing there is positioned the bearing race 16, and at the upper portion of the housing the bearing race 18. These races conform to the races 20 and 22 on the worm and between the races there are received the rollers 24 which provide bearings for the worm.

The upper portion of the housing is closed by the threaded collar 26 which is pinched about the mast 2 by the ears 28 and the bolt 30 while the upper portion of the housing 10 is pinched about the collar 26 by means of the ears 32 and the bolt 34.

The housing 10 has an enlargement 36 at one side. The enlargement 36 is provided with the opening 38 which is adapted to be closed by the cover 40, formed integral with a tube 42, which is provided at its opposite end with a flange 44 secured by means of the rivets 46 to the web of the chassis 48.

In the tube 42 there are received the bearings 50 in which the shaft 52 is journalled. The end of the shaft 52 is enlarged as indicated at 54 and the enlarged end is slotted as at 55, the walls of the slot being indicated at 56. A roller 58 is received in the slot 55 and is journalled on the bolt 60 mounted in the walls 56. The periphery of the roller is tapered as shown in Figs. 1 and 2 and is received in the groove 62 formed by the thread 64 of the worm 8. Suitable metallic thrust washers or spacers 66 are provided between both sides of the roller 58 and the walls 56 of the slot 55.

As is shown at 68 in Fig. 1 the walls 56 project well toward the worm 8 and are received within the groove or channel 62. The ends 68 of the walls 56 are tapered as shown and are normally out of contact with the thread. The space between the ends 68 and the thread 64 is considerably exaggerated in Fig. 1 for purposes of clearer illustration and the position shown in Fig. 1 is the normal operating position of the device. The motion is transmitted from the hand wheel 4 to the tube 6, worm 8, and roller 58 to the shaft 52. If for any reason, such as road shocks or otherwise, the roller 58 should become broken or damaged, there will be a serious interference with the operation of the steering mechanism owing to the fact that the mating relation between the roller 58 and worm 8 is interrupted and/or destroyed. If the roller for any reason should become broken, either one of the sides 56 at their ends 68 will strike against or mesh with the thread 64 of the worm 8. The steering will now proceed substantially as heretofore, except that there will be a very slight play between the ends 68 and the worm thread, but this play will not be such as will afford a serious interference with effective steering.

Inasmuch as it is not usually possible at initial application to obtain an accurately mating relation between the roller 58 and the worm 8, means is provided to secure a relative adjustment. For this purpose the cover 40 is adjustably mounted with reference to the housing 10 and inasmuch as the shaft 52 is journalled in the cover the adjustment of the cover will necessarily accomplish the adjustment of the roller 58.

The cover 40 is pivoted on the securing bolt indicated at 70. The opposite side of the cover has the bolt 72, better shown in Fig. 4. The bolt 72 has the threaded end 74 received in the threaded opening 76 of the housing 10, and is provided with the tapered shank portion 78 which is received in the tapered opening 80 in the cover 40. Beyond the tapered portion 78 the bolt is screw threaded as indicated at 82 and has the nut 84 to lock the bolt in position when the adjustment has been accomplished.

From an examination of Fig. 4 it will be apparent that with the nut 84 to the extreme left and the bolt 72 turned to move it inwardly, the tapered portion 78 will move the cover 40 upwardly and simultaneously cause the roller 58 to move inwardly closer to the worm 8. When the proper adjustment has been accomplished, the nut 84 is rigidly screwed home to hold the plate immovably in position. The bolt 70 is then rigidly applied to destroy the pivotal connection and additional bolts 86 and 88 are tightened. The bolts 86 and 88 operate in the enlarged openings 90.

Additional means indicated at 92 is provided in the housing 10 at the end of the shaft 52 to secure proper longitudinal adjustment.

To the free end of the shaft 52 there is secured the arm or link 94 held on to the shaft and by means of the washer 96 and nut 98. A suitable steering linkage is operated from the arm 94.

I claim:

1. In a steering device, a turnable steering tube, a worm rigidly mounted relative to the tube, a shaft, means rotatably mounted on the shaft and mating with the worm and adapted to be moved thereby to operate the shaft, and means on said shaft normally out of engagement with the worm but adapted to be engaged by the worm thread when the first-named means is rendered inoperative.

2. In a steering device, a turnable steering tube, a worm rigidly mounted relative to said tube, a shaft, means rotatably mounted on the shaft and mating with the worm and adapted to be moved thereby to operate the shaft, and a tine on said shaft normally out of engagement with the worm but adapted to be engaged by the worm thread when said means is rendered inoperative.

3. In a steering device, a turnable steering tube, a worm rigidly mounted relative to said tube, a shaft, means rotatably mounted on the shaft and mating with the worm and adapted to be moved thereby to operate the shaft, and a plurality of tines on said shaft normally out of engagement with said worm but adapted to be engaged by the thread of the worm when said means is rendered inoperative.

4. In a steering device, a turnable steering tube, a worm rigidly mounted relative to said tube, a shaft, means rotatably mounted on the shaft and mating with the worm and adapted to be moved thereby to operate the shaft, and a tine on said shaft normally extending between but out of engagement with the worm thread but adapted to be engaged by said thread when said means is rendered inoperative.

5. In a steering device, a turnable steering tube, a worm rigidly mounted relative to said tube, a shaft, means rotatably mounted on the shaft and mating with the worm and adapted to be moved thereby to operate the shaft, and a plurality of tines on said shaft normally extending between but out of engagement with the worm thread but adapted to be engaged by said thread when said means is rendered inoperative.

6. In a steering device, a turnable steering tube, a worm rigidly mounted relative to said tube, a shaft, means rotatably mounted on the shaft and mating with the worm and adapted to be moved thereby to operate the shaft and a pair of tines on said shaft on the opposite sides of said means and normally extending between but out of engagement with the worm thread but adapted to be engaged by said thread when said means is rendered inoperative.

7. In a steering device, a turnable steering tube, a worm rigidly mounted relative to said tube, a shaft, means rotatably mounted in a slot in said shaft and mating with the worm and adapted to be moved thereby to operate said shaft, the sides of said slot normally out of engagement with said worm but adapted to be engaged and moved thereby when said means is rendered inoperative.

8. In a steering device, a turnable steering tube, a worm rigidly mounted relative to said tube, a shaft, means rotatably mounted in a slot in said shaft and mating with the worm and adapted to be moved thereby to operate said shaft, the sides of said slot normally extending into said worm between the spirals of the thread thereof but out of contact therewith but adapted to be engaged and moved by said thread when said means is rendered inoperative.

In testimony whereof I affix my signature.

LLOYD BLACKMORE.